(12) United States Patent
Schauer et al.

(10) Patent No.: US 7,609,725 B2
(45) Date of Patent: Oct. 27, 2009

(54) LARGE TRANSMISSIONS ON PACKETIZED DATA BUS

(75) Inventors: Steven A. Schauer, Loveland, CO (US); Timothy D. Thompson, Windsor, CO (US); Christopher D. Paulson, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 1302 days.

(21) Appl. No.: 10/377,682

(22) Filed: Feb. 28, 2003

(65) Prior Publication Data

US 2004/0170193 A1 Sep. 2, 2004

(51) Int. Cl.
*H04J 3/24* (2006.01)
(52) U.S. Cl. .................. 370/474; 370/470; 709/232; 709/236
(58) Field of Classification Search ............ 370/470, 370/474; 710/260–269, 112, 305–307, 64–68, 710/35; 709/250, 230–236; 714/30, 40, 714/43, 715, 821; 711/105
See application file for complete search history.

(56) References Cited

U.S. PATENT DOCUMENTS

| | | | | |
|---|---|---|---|---|
| 5,764,997 | A * | 6/1998 | Gulick | 710/260 |
| 5,850,512 | A * | 12/1998 | Song | 714/43 |
| 5,937,165 | A * | 8/1999 | Schwaller et al. | 709/224 |
| 5,986,953 | A * | 11/1999 | Kim et al. | 365/201 |
| 6,098,124 | A * | 8/2000 | Odom | 710/52 |
| 6,272,151 | B1 * | 8/2001 | Gupta et al. | 370/489 |
| 6,304,911 | B1 * | 10/2001 | Brcich et al. | 709/237 |
| 6,421,745 | B1 * | 7/2002 | James et al. | 710/34 |
| 6,502,209 | B1 * | 12/2002 | Bengtsson et al. | 714/35 |
| 6,891,832 | B1 * | 5/2005 | Chien et al. | 370/395.1 |
| 6,891,855 | B2 * | 5/2005 | Bruckman | 370/468 |
| 6,907,042 | B1 * | 6/2005 | Oguchi | 370/412 |
| 7,003,102 | B2 * | 2/2006 | Kiko | 379/413 |
| 7,020,807 | B2 * | 3/2006 | Ehmann et al. | 714/43 |
| 7,062,754 | B2 * | 6/2006 | Chang | 717/124 |
| 7,103,674 | B2 * | 9/2006 | Brown et al. | 709/234 |
| 7,103,693 | B2 * | 9/2006 | Anand et al. | 710/260 |
| 7,355,971 | B2 * | 4/2008 | Jason, Jr. | 370/231 |
| 2001/0055317 | A1 * | 12/2001 | Kajizaki et al. | 370/474 |
| 2002/0031086 | A1 * | 3/2002 | Welin | 370/229 |
| 2003/0200368 | A1 * | 10/2003 | Musumeci | 710/260 |
| 2004/0015744 | A1 * | 1/2004 | Klotz et al. | 714/43 |
| 2004/0015762 | A1 * | 1/2004 | Klotz et al. | 714/742 |
| 2004/0030955 | A1 * | 2/2004 | Trembley | 714/25 |

* cited by examiner

*Primary Examiner*—Aung S Moe
*Assistant Examiner*—Habte Mered
(74) *Attorney, Agent, or Firm*—William W. Cochran; Cochran Freund & Young LLC

(57) ABSTRACT

A packetized data bus interface may be placed in a mode where data packets may be transmitted that are much larger than the standard packet size. The mode may allow the interface device and any other devices, networks, or transmission lines attached to the interface device to be more thoroughly exercised than previously able. The mode may be used for characterizing various aspects of the data interface.

10 Claims, 3 Drawing Sheets

LARGE TRANSMISSIONS ON PACKETIZED DATA BUS

BACKGROUND OF THE INVENTION a. Field of the Invention

The present invention pertains to data transmission systems and specifically to packetized data transmission busses.

b. Description of the Background

Packetized data transmission busses are commonplace in today's electronic systems. Each transmission has a maximum size and typically has a start of frame character, a preamble, the data payload, a checksum, and an end of frame character. The specifications of the transmissions are defined in the various standards and specifications of the particular data bus. TCP/IP and SATA/SAS are examples of packetized data transfer protocols.

The transfer of a large block of data is normally broken into several small transmissions according to the specification of the protocol. If the maximum data payload is 8 K bytes, then each transmission contains 8 K bytes of information. As many individual packets are transmitted as necessary to complete the large block of data.

Packetized data transfer protocols do not necessarily stress the data transfer hardware because data is sent in small bursts. The data transfer bus or network may be able to handle continuous high-speed traffic, however the device connected to the bus or network may only need to transmit at high speed for the time required to send or receive an individual packet.

An interface to a packetized data transfer protocol may have many functions performed in hardware. For example, the process of taking a large data block, breaking the data into packets, adding the appropriate characters to the beginning and end of the packets, and transferring the packet onto the data bus may be implemented by preconfigured logic in an integrated circuit. A routine implemented as an integrated circuit has the ability to operated very fast while being a very low cost.

When a packetized data bus is implemented in a hardware interface, the interface may be physically restricted to only transmitting data in discrete packets. In the development and testing of interface performance, including testing downstream devices and network throughput, the transmissions of discrete packets of data may not reveal design or performance problems with the transmission scheme. Certain design flaws or manufacturing defects may only be apparent when continuous transmissions are passed across the data bus. Such flaws or defects may be only marginally detectable during normal operation with discrete packets, but may be very obvious during continuous transmissions.

It would therefore be advantageous to provide a system and method for operating a packetized data bus interface in a mode wherein the data packets may exceed the standard data packet size. It would be further advantageous to make the mode selectable for testing, debugging, and characterizing of the data bus.

SUMMARY OF THE INVENTION

The present invention overcomes the disadvantages and limitations of the prior art by providing a system and method for disabling the packetizing function of a packetized data interface. An interface to a packetized data bus may have a flag that allows the interface to transmit data packets in excess of the standard packet size, so that virtually continuous operation can be achieved.

The present invention may therefore comprise a data interface comprising: a data input; an override signal input; an output being connected to a data bus, said data bus being a packetized data bus for the communication of data in packetized form having a maximum packet size; and a processor capable of receiving a large data block on said data input, said large data block being larger than said maximum packet size, creating a large packet of data that is larger than said maximum packet size when said override signal input is actuated, and transmitting said large packet over said output, said processor further capable of receiving said large data block on said data input, creating a plurality of small packets of data that are the same size or smaller than said maximum packet size when said override signal input is not actuated, and transmitting said small packets over said output.

The present invention may further comprise a method of transmitting data on a packetized data interface comprising: providing a data input; providing an override signal input; providing a packetized data bus for the communication of data in packetized form having a maximum packet size; providing an output connected to said data bus; receiving a first large data block on said data input, said first large data block being larger than said maximum packet size; creating a first large packet of data that is larger than said maximum packet size when said override signal input is actuated; transmitting said large packet over said output; receiving a second large data block on said data input, said second large data block being larger than said maximum packet size; creating a plurality of small packets of data that are the same size or smaller than said maximum packet size when said override signal input is not actuated; and transmitting said small packets over said output.

Advantages of the present invention include that a data bus interface may be exercised with much larger data packets than would normally pass across the data bus, uncovering performance issues and allowing characterization of the data bus in a much more thorough manner than could be done previously. The larger data packets may be used to saturate devices upstream and downstream from the interface and thereby characterize the performance of those devices. Further, the large data packets will allow performance issues with the interface itself to be uncovered.

DETAILED DESCRIPTION OF THE INVENTION

Figure 1:
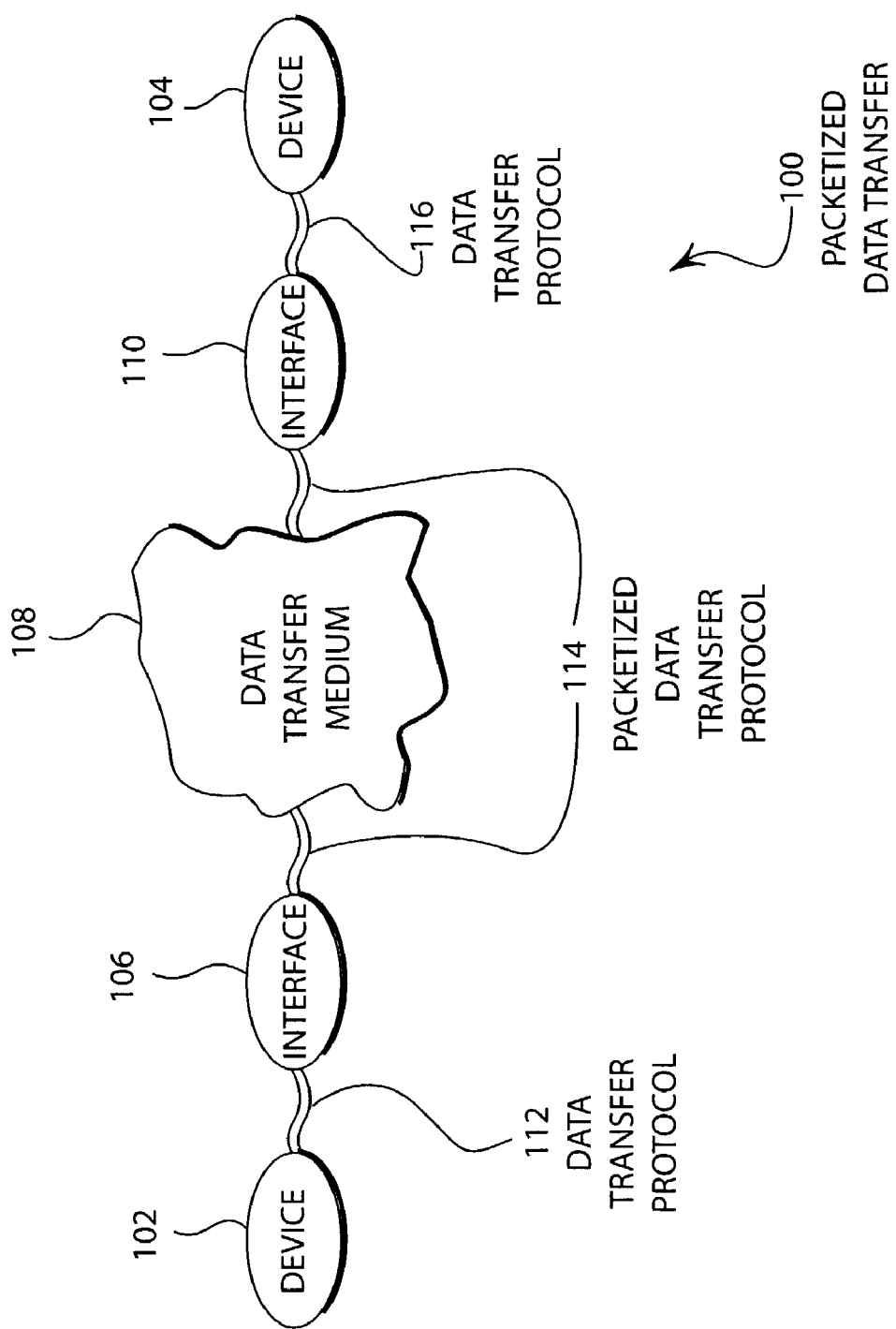
FIG. 1 is an illustration of an embodiment of the present invention of a packetized data transfer system.

FIG. 1 illustrates an embodiment 100 of a packetized data transfer system. The devices 102 and 104 are connected to communicate. The device 102 connects to an interface 106 that connects through a data transfer medium 108 and a second interface 110 to the device 104. The device 102 communicates with the interface 106 with a data transfer protocol 112. The interface 106 communicates to interface 110 with a packetized data transfer protocol 114. The interface 110 communicates with device 104 through data transfer protocol 116.

The devices 102 and 104 may be computers, peripherals, storage devices, appliances, or any other device that may send or receive data. An example may be individual computers, computer peripherals, networked peripherals or appliances, or any other device capable of communicating with a packetized data transfer protocol.

The data transfer medium 108 may be a cable, as in the case of a SCSI interface, or may be a complex network such as the Internet.

The packetized data transfer protocol 114 typically sends data in packets that cannot exceed a specific size. For large data transmissions, the protocol 114 may require that the data be sent in several smaller packets. Each packet may comprise a header, a data payload, and a footer. The header may include specialized characters, routing information, packet type, or any other information that may be required. The data payload may include the raw data. In some cases, the data may be compressed, translated, or otherwise manipulated from the raw state. The footer may include checksums, error correcting codes, or other mechanisms whereby the transmission may be verified. The footer may also include special characters or sequences whereby the end of packet may be determined.

When the interfaces 106 and 110 are being developed and tested, engineers may send data across the interfaces 106 and 110 to test and characterize the performance of the interfaces. Often, engineers may attempt to pass large amounts of data across the interfaces in order to stress the interface. As the interface is stressed, some weaknesses in the design may come to light and the engineer may then improve the design. It is common practice to pass specific, predetermined patterns of data across an interface to bring to light any effects due to harmonics, saturation, or other causes of failures. Such effects may be miniscule and difficult to detect when random data is being passed, but may be readily apparent when specific patterns are used.

With this in mind, testing or characterizing the interface by using a small, packetized data stream is difficult because small data packets may not cause harmonic effects, saturation, or other causes of failures to become readily apparent. When a small data packet is transferred, any harmonic or other effect may be very small and difficult to detect. The harmonic or other effect, however, may cause a data transmission error to occur. Such errors may be infrequent but may be correctable when an engineer may reproduce the error.

The embodiment 100 may allow for large packets to be transmitted across the interfaces 106 and 110 for testing and characterization of the interfaces. The large packets may be greater in size than a standard maximum packet size for the particular protocol. In some cases, the large packet may be many times larger than the maximum packet size.

The large packets used for testing may be a particular pattern of data. 01010101 patterns, checkerboard patterns, and other patterns as those skilled in the art may devise may be applicable to certain interfaces. In some cases, the interfaces may have a portion of the interface, such as an input, output, or internal register that certain patterns may exacerbate specific weaknesses or propensity for errors. For example, if an internal register is eight bytes wide, a repeating pattern of data that is tailored to an eight byte register may stress the register and cause errors to occur.

Figure 2:
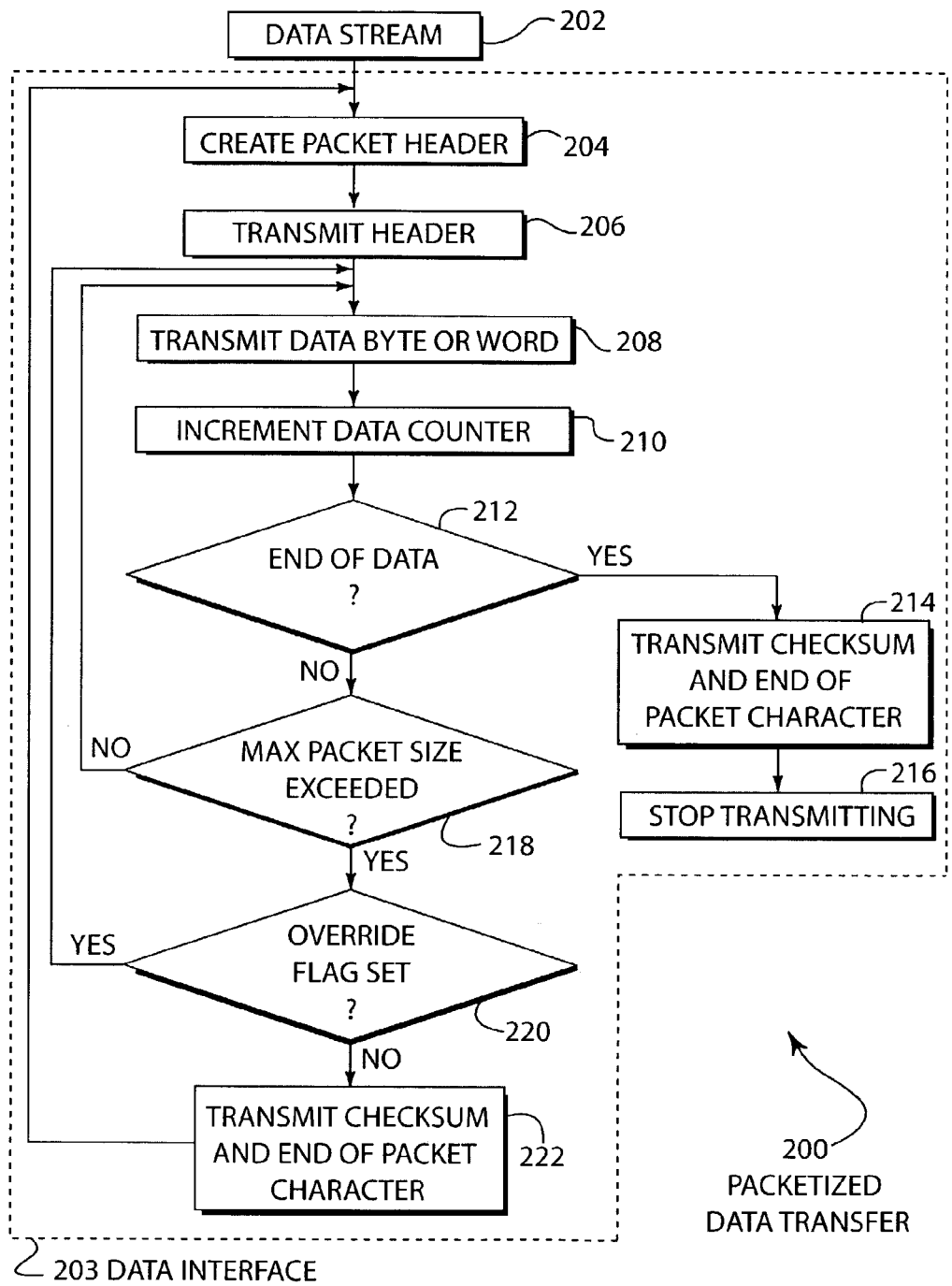
FIG. 2 is an illustration of a flow diagram of an embodiment of a packetized data transfer.

FIG. 2 illustrates a flow diagram of an embodiment 200 of a packetized data transfer. A data stream in block 202 enters the data interface in block 203. A packet header is created in block 204 and transmitted in block 206. A data byte or word is transmitted in block 208 and a counter incremented in block 210. If the end of data is reached in block 212, the footer of the packet, possibly including a checksum and other characters, is transmitted in block 214 and the transmission stops in block 216. If the end of data is not reached in block 212, the maximum size of the packet is checked in block 218. If the maximum size of the packet is not exceeded in block 218, then another data byte or word is transmitted in block 208. If the maximum packet size is exceeded in block 218 and the override flag is set in block 220, the process returns to block 208 and another data byte is transmitted. If the override flag is not set in block 220, the end of packet information is transmitted in block 222 and the process returns to block 204 to start another packet.

The embodiment 200 allows larger packet sizes than would be normally possible by setting the override flag in block 220. By setting this flag, very large packet sizes may be transmitted and thereby the interface may be tested, evaluated, and characterized. Further, the embodiment 200 allows for normal sized packets to be sent if the override flag is not set in block 220.

Figure 3:
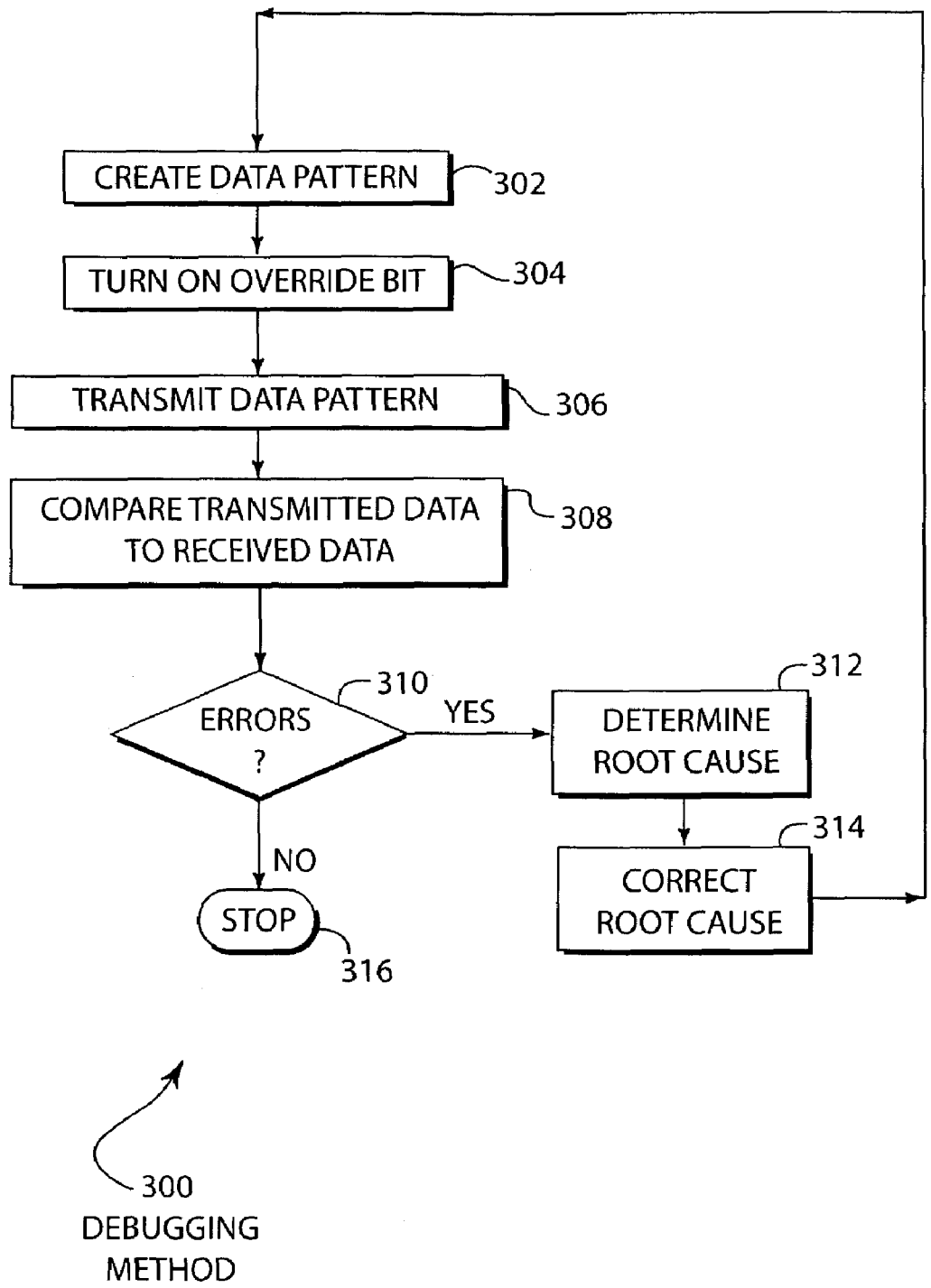
FIG. 3 is an illustration of a flow diagram of an embodiment of the present invention of a debugging method for a packetized data transfer protocol.

FIG. 3 illustrates a flow diagram of an embodiment 300 of a debugging method for a packetized data transfer protocol. A data pattern is created in block 302. The override bit is turned on in block 304 and the data pattern is transmitted in block 306. The transmitted data is compared to the received data in block 308. If an error was found in block 310, the root cause is determined in block 312, corrected in block 314, and the process is repeated. If no errors were determined in block 310, the process halts.

The embodiment 300 illustrates a mechanism whereby large patterns of data may be useful in helping to uncover problems with an interface design. Those skilled in the art will appreciated that the override bit may be used for other functions, such as for characterization of the interface or for manufacturing defect testing or for other functions.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A data interface comprising:
    a data input for receiving a large data block, said large data block being larger than a maximum packet size of a packetized data transfer protocol of a packetized data bus;
    an output connected to said packetized data bus for transmitting data packets on said packetized data bus;
    an override flag for indicating when to override said maximum packet size of said packetized data bus; and
    a processor that receives said large data block on said data input, when said override flag indicates to override said maximum packet size of said packetized data bus, said processor overrides said maximum packet size of said packetized data bus to allow transmission of a packet larger than said maximum packet size of said packetized data bus, creates a large data packet larger than said maximum packet size of said packetized data bus from said large data block, and transmits said large data packet over said output on said packetized data bus, and when said override flag does not indicate to override said maximum packet size of said packetized data bus, said processor creates a plurality of small packets no larger than said maximum packet size from said large data block and transmits said plurality of small packets over said output on said packetized data bus.

2. The data interface of claim 1 wherein said data interface is contained within an integrated circuit chip.

3. The data interface of claim 1 wherein said large data block has a predetermined pattern of data.

4. A method of transmitting data on a packetized data interface comprising:
   providing a data input for receiving a large data block, said large data block being larger than a maximum packet size of a packetized data transfer protocol of a packetized data bus;
   providing said packetized data bus for communicating data in packetized form;
   providing an output connected to said packetized data bus;
   providing an override flag for indicating when to override said maximum packet size of said packetized data bus;
   receiving said large data block on said data input;
   overriding said packetized data transfer protocol of said packetized data bus to allow transmission of a packet larger than said maximum packet size of said packetized data bus when said override flag indicates to override said maximum packet size of said packetized data bus;
   creating a large data packet larger than said maximum packet size of said packetized data bus from said large data block when said override flag indicates to override said maximum packet size of said packetized data bus;
   transmitting said large data packet over said output on said packetized data bus when said override flag indicates to override said maximum packet size of said packetized data bus;
   creating a plurality of small packets of data that are no larger than said maximum packet size of said packetized data bus when said override flag does not indicate to override said maximum packet size of said packetized data bus; and
   transmitting said small packets over said output on said packetized data bus when said override flag does not indicate to override said maximum packet size of said packetized data bus.

5. The method of claim 4 wherein said method is implemented within an integrated circuit chip.

6. The method of claim 4 wherein said large data block has a predetermined pattern of data.

7. A method of debugging a packetized data interface comprising:
   creating a large data block containing a data pattern for input into a packetized data bus for the communication of data in packetized form, said packetized data bus having a packetized data transfer protocol that has a maximum packet size;
   activating an override signal input to override said packetized data transfer protocol of said packetized data bus to allow transmission of a packet larger than said maximum packet size of said packetized data bus;
   receiving said large data block on a data input of said packetized data interface;
   creating a large data packet larger than said maximum packet size of said packetized data bus from said large data block;
   transmitting said large data packet over said output on said packetized data bus when said override flag indicates to override said maximum packet size of said packetized data bus;
   transmitting said large data packet over an output of said packetized data interface connected to said packetized data bus;
   comparing said transmitted large data packet to said received large data block to find errors in said transmitted large data packet; and
   determining at least one cause of errors transmitted by said packetized data interface.

8. The data interface of claim 3 wherein said predetermined pattern of data comprises at least one of the group consisting of: a 01010101 pattern, a checkerboard pattern, and another pattern as may be devised to be applicable to certain interfaces.

9. The method of claim 6 wherein said predetermined pattern of data comprises at least one of the group consisting of: a 01010101 pattern, a checkerboard pattern, and another pattern as may be devised to be applicable to certain interfaces.

10. The method of claim 7 wherein said data pattern comprises at least one of the group consisting of: a 01010101 pattern, a checkerboard pattern, and another pattern as may be devised to be applicable to certain interfaces.

* * * * *